Feb. 11, 1969 C. N. TAYLOR 3,426,490
MASONRY VENEER SIDING AND MOLD
Filed Dec. 23, 1966
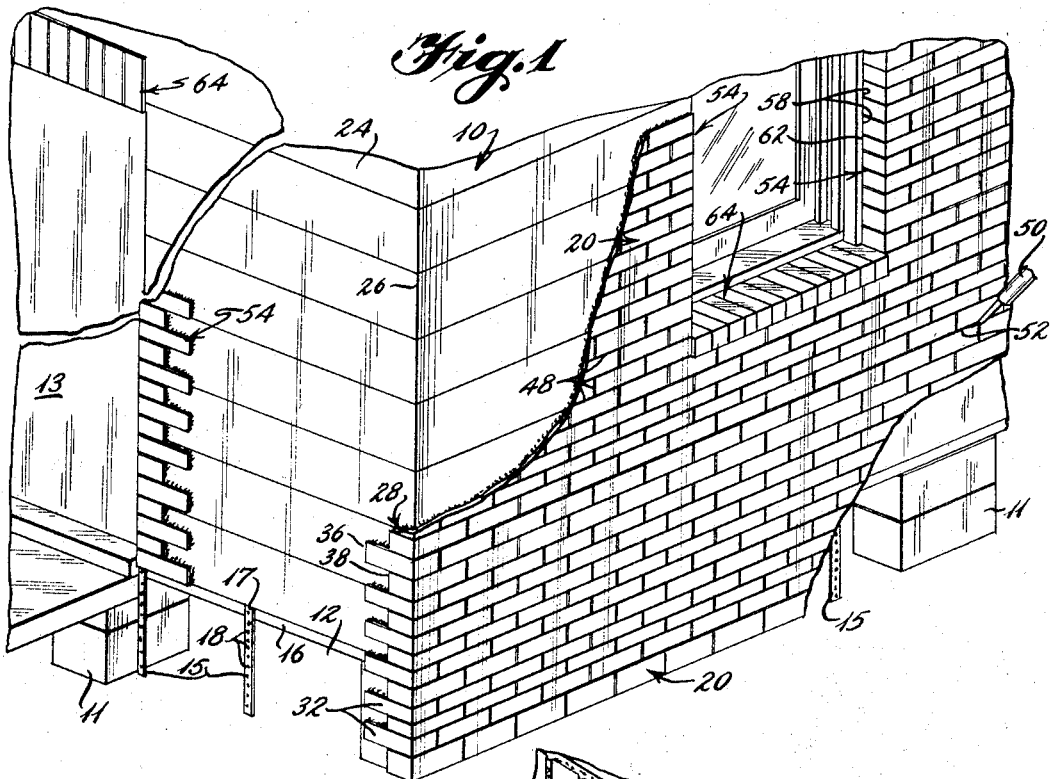
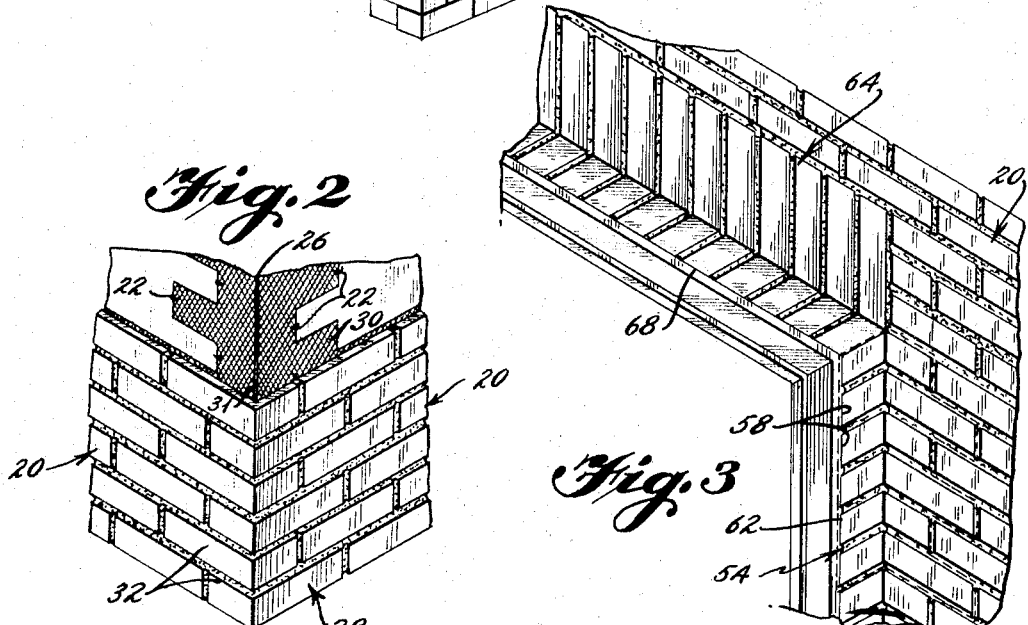
INVENTOR
CALVIN N. TAYLOR
BY
ATTORNEYS Feb. 11, 1969 C. N. TAYLOR 3,426,490
MASONRY VENEER SIDING AND MOLD
Filed Dec. 23, 1966 Sheet 2 of 3
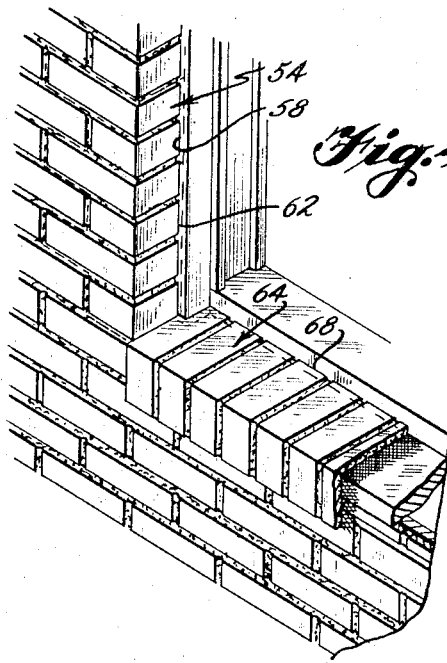
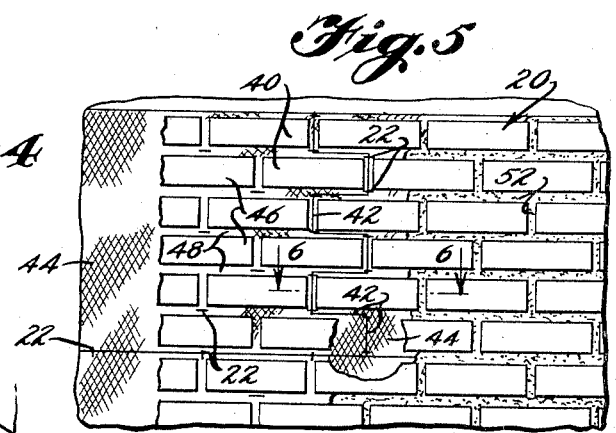
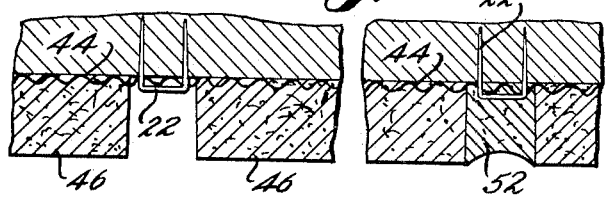
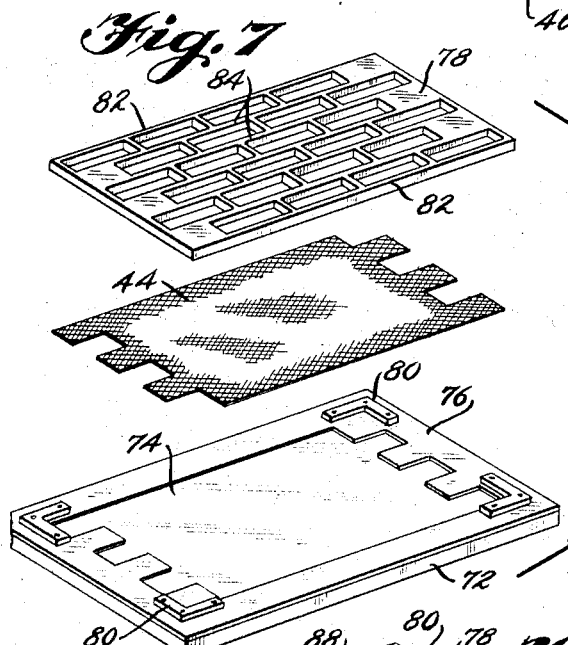
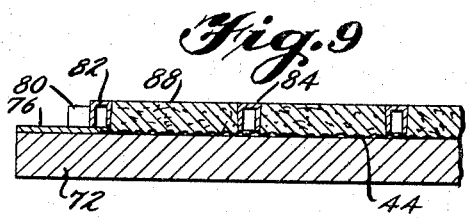
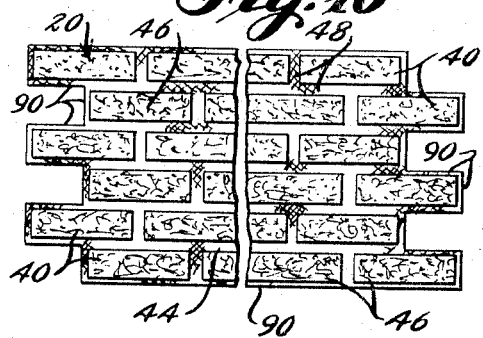
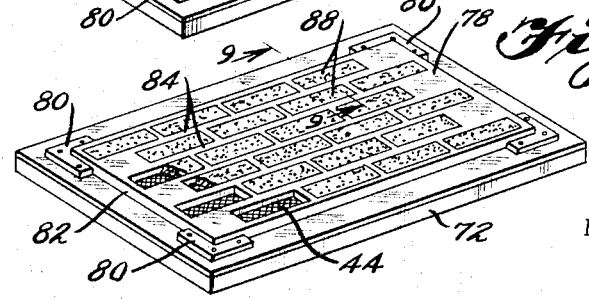
INVENTOR
CALVIN N. TAYLOR
BY
ATTORNEYS Feb. 11, 1969
C. N. TAYLOR
3,426,490
MASONRY VENEER SIDING AND MOLD
Filed Dec. 23, 1966
Sheet 3 of 3
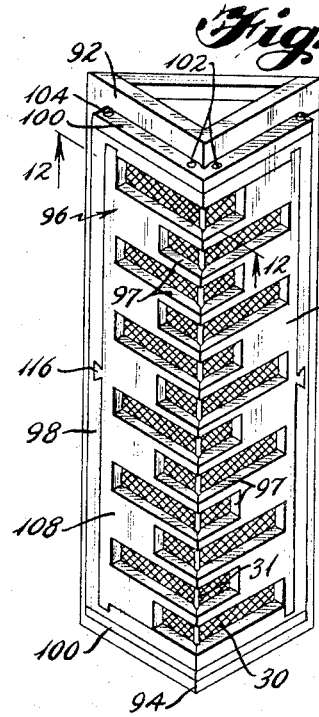
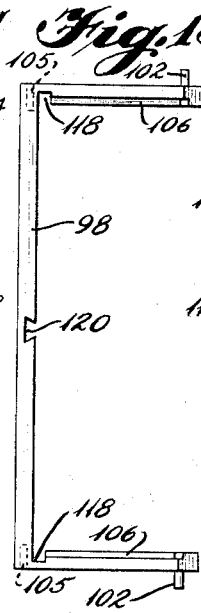
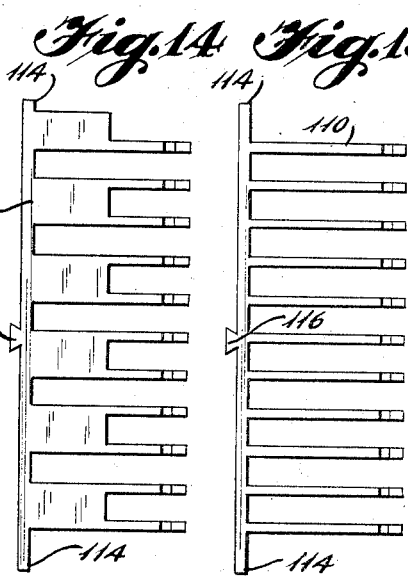
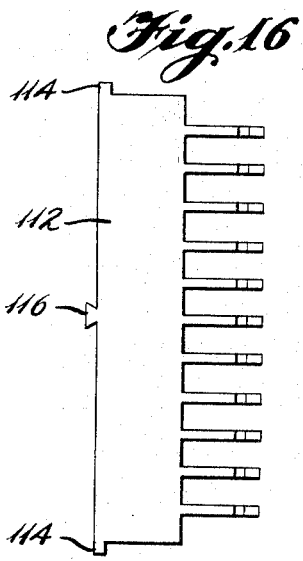
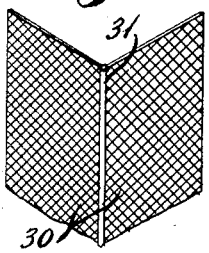
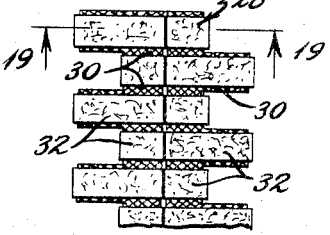
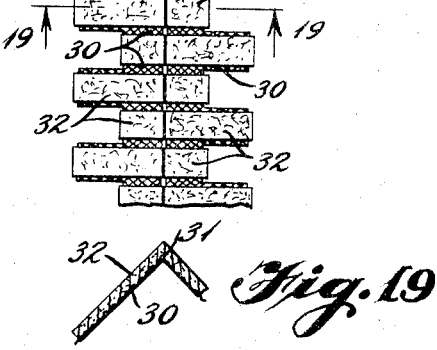
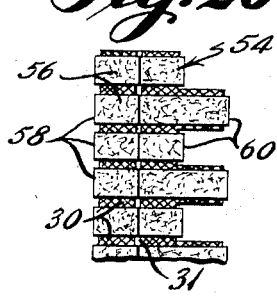
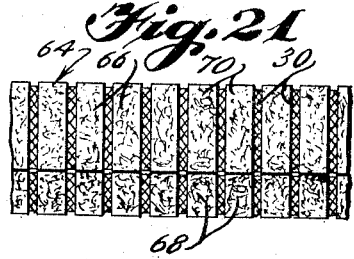
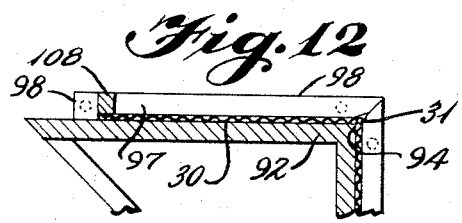
INVENTOR
CALVIN N. TAYLOR
BY
ATTORNEYS _United States Patent Office_

3,426,490
Patented Feb. 11, 1969

3,426,490
MASONRY VENEER SIDING AND MOLD
Calvin N. Taylor, Atmore, Ala., assignor, by mesne assignments, to Bric-Wall Manufacturing Co., Inc., Uriah, Ala.
Filed Dec. 23, 1966, Ser. No. 604,299
U.S. Cl. 52—204    5 Claims
Int. Cl. E04f *13/14;* E04g *13/00;* E06b *1/24*

ABSTRACT OF THE DISCLOSURE

Apparatus for covering corners of a building and mold means for producing such apparatus. The apparatus consists of a masonry veneer panel including a plurality of blocks mounted in spaced relation on a base and simulating the ends and sides of conventional bricks.

---

This invention relates to an improvement in the building arts, and more particularly to an improved masonry panel and a method for applying the panel to walls or floors.

Many homes built today are of brick construction. The homes are of conventional frame construction, but have courses of brick laid in front of them. These brick courses serve a covering function rather than a load-bearing function. Brick panels can serve this siding function at lesser cost, but present panels suffer various disadvantages. Some are merely tarpaper sheets printed to resemble courses of brick. Such sheets do not appear realistic and do not have the weather shielding advantages of masonry. Other panels are made of concrete or other plastic material and are shaped and colored to simulate courses of brick, but these panels are heavy, inflexible, and difficult to attach to existing frame walls.

Some panels have individual brick veneer blocks carried on a composition board and tied together with wire mesh. Such panels are nailed to frame walls, and then mortar is placed between the blocks. These have many advantages, but may not be flexible enough to accommodate the irregularities of the underlying wall. Furthermore, moisture may enter the spaces between the fiberboard backing and the frame wall. The panels are essentially held to the frame wall only by nails or staples. As the mortar disintegrates, it may fall out of the cracks creating the danger of moisture entering behind the panels.

Another type of veneer panel previously applied to the frame wall has interspaces between individual brick simulating blocks and is attached to a wall by pressing it into cement. To avoid the danger that cement may stain the front of such ricks these panels have front coverings which are removed after the cement panel sets. Such front coverings interfere with flexibility of the panel. Since the panel is held only by cement, it may peel off in time, or the cement might shrink leaving gaps between individual blocks.

Still other brick veneer coverings are formed by securing resilient clips to a frame wall and clipping individual veneer blocks within these clips. Mortar is often placed between the individual blocks, but the danger exists that particular blocks may fall out, as, for example, if settling structural deformations spread the resilient clips in spots and break the mortar bond.

It is an object of the present invention to form a masonry veneer panel which is flexible to accommodate wall variations, and which may be readily secured to a wall, with mortar tightly engaging individual blocks of the panel and itself in engagement with the underlying wall to prevent the formation of large moisture accumulating spaces behind the panels.

Another object is to provide a method for attaching a brick veneer panel to a wall.

A further object is to provide a brick veneer panel in which individual brick simulating blocks are bonded together to form a panel by a wire mesh embedded within each brick to eliminate the danger of particular blocks falling out.

A further object is to provide a brick veneer corner unit particularly useful at the edge of a wall opening for a door, window or the like.

Other objects and advantages of the invention will be apparent from the following description taken in conjunction with the accompanying drawings in which:

FIG. 1 is a perspective of the corner and side wall of a building illustrating the application of the invention thereto;

FIG. 2, a fragmentary perspective of a corner of a building with the invention applied and having parts broken away;

FIG. 3, a fragmentary perspective of the upper corner of a window or door opening with the invention applied;

FIG. 4, a fragmentary perspective of the lower corner and sill of a window with parts broken away;

FIG. 5, a fragmentary elevational view of a portion of a building wall with units of the covering applied thereto and with portions broken away to show the securing of the mesh lath;

FIG. 6, an enlarged fragmentary view taken on the line 6—6 of FIG. 5 illustrating how the mesh is secured to a building wall and also showing the mortar applied between the joints of aligned blocks.

FIG. 7, an exploded perspective view of the grid mold, the precut mesh lath and jig for forming the wall units;

FIG. 8, a perspective view of the grid mold and jig assembled with mesh lath in place and portions of the grids filled with plastic or the like forming the brick structure;

FIG. 9, a fragmentary enlarged view of the mold taken on the line 9—9 of FIG. 8;

FIG. 10, an elevational view of a unit of blocks after being cast in the jig mold and before being applied to a wall structure;

FIG. 11, a perspective of a corner jig mold asembled with corner mesh lath in place prior to pouring plastic material;

FIG. 12, a section taken on the line 12—12 of FIG. 11;

FIG. 13, a plan view of one-half of a blank grid mold form for corners, two halves being used in assembly;

FIGS. 14, 15 and 16, are plan views of different grid molds that when assembled in the blank form shown in FIG. 13, will form a corner mold;

FIG. 17, a perspective of a metal lath used in corners prior to cutting;

FIG. 18, a plan view of a corner unit looking into the apex of the corner;

FIG. 19, a section through one of the blocks taken on the line 19—19 of FIG. 18;

FIG. 20, a plan view of a corner used for doors and window openings; and,

FIG. 21, an elevational view of the corner unit used in forming the header or sill of a door or window.

Briefly stated the objects desired are accomplished by forming a brick veneer panel having individual brick veneer blocks held together by a wire mesh. The veneer blocks are of the length, width and color of conventional bricks but only about one-half inch thick and are made from a plastic material such as concrete or fired clay. They are molded on a wire mesh lath with the veneer blocks spaced from each other and positioned in a staggered pattern simulating a course of bricks. Until the panel is applied the veneer blocks are tied together only by the wire mesh and thus have much greater flexibility than prior art panels which are also tied together by backing boards or protective covers. The panels is secured to a wall with nails or staples driven through the wire mesh between individual veneer blocks. Mortar is applied between the veneer blocks and is anchored in place since it sets about the mesh and some of it passes behind veneer blocks. The interspaces behind the panel are very small since each block is close to the wall and the mortar engages the underlying wall around each veneer block. Particular panels are shaped for particular purposes. Flat panels consisting of rows of veneer blocks cover most of the walls. Corners and the edges of window and door openings are covered with corner panels. These have perpendicular surfaces and the veneer blocks are shaped to simulate both the side and the end of a brick. The alternate rows of brick veneer blocks are staggered so that the blocks of alternate rows project beyond the end blocks of intermediate rows to form an interlocking edge for engaging the adjacent panel. However, corner panels designed to fit around the edge of a wall opening for a door or window have one straight side which fits into the opening and a staggered side which mates with adjacent flat panels.

The panels or units of blocks may be used for new or remodeling work and are adapted to be used on houses, store fronts, floors and inside of houses where one might want a brick wall, including a fireplace, without first having to pour footings to support the same. The panels fill be supported from the wall applied to and are easily applied thereto.

With continued reference to the drawings, FIGS. 1 through 6 illustrate the present invention applied to the outside walls of a building or house 10 supported on blocks 11 with a crawl space 12. A door 13 and window 14 have also been provided.

To completely cover a building such as the structure 10, it is first necessary to drive straps 15 into the ground and fasten them at their upper ends to lower sill or plate 16 by nails 17. The straps 15 are provided with a series of openings 18 for securing the brick panel units 20 against the lower sides of the foundation of the structure 10 and the straps 15 by fastening means, such as wire or spring type clips (not shown). If desired the crawl space 12 may be left open where, in this case, the lower edge of the panel 20 is mounted flush with the lower edge of sill or plate 16 and fastened thereto by staples 22.

When covering the side walls 24 with the brick-like covering, it is best to cover the corners 26 first with the corner unit 28 being secured by staples 22 through the mesh corner lath 30 supporting staggered corner blocks or bricks 32. The staples are driven through the exposed mesh 30 between the joints 34 of the corner blocks 32 into the side wall 24.

As can be seen in FIGS. 1 and 18, the corner bricks 32 are staggered as at 36 and 38 with one long and one short brick. The flat side panels 20 having similar offset or staggered bricks 40, when assembled with the corner unit 28, interlock with the staggered bricks 36 and 38. The panel members 20 can be interlocked with one another due to the offset bricks 40, as appears in FIG. 5, at joining edges 42 of metal lath 44 between two panel members 20.

The panel members 20 are made up of a series of thin blocks 46 molded to the metal lath 44 by means to be described later, each block 46 being spaced from its adjoining block, the spaces forming uniform valleys or joints 48 with the mesh metal lath 44 exposed therebetween, as seen in FIGS. 5 and 10. As seen in FIG. 5, blocks 46 of panel members 20 are staggered as indicated at 40 so that the unit can be turned end for end and it will still interlock with the adjacent panel 20.

The side panels 20 are laid against the side wall 24 and secured in place by staples 22 driven through the mesh lath 44 at the joints 48, thus securing the panel members 20 to the side of the building 10. After the sides of the building are covered with the brick panels 20, a caulking gun 50 filled with a cream-like consistency of plastic or mortar 52 is used to fill the valleys 48 between the bricks 46 thus pointing up the wall and giving a finished appearance.

The openings about the door 13 and window 14 use a different type corner unit 54 on the upright sides, as seen in FIGS. 1, 3 and 4. The corner unit 54 employs two different types of bricks molded to corner lath 30, as seen in FIG. 20. On the edge of one side of the corner all the bricks 56 are equal in length as at 58. At the other side the bricks 56 are staggered as at 60 so that they interlock with side panels 20. When the corner members 54 are used about a door or window opening, the bricks on the short side having their edges equal as at 58 are turned so that they lie against the door or window frame as at 62 in FIGS. 3 and 4, giving a finished appearance. On the opposite side staggered edges 60 are interlocked with staggered end of side panel 20.

Another type of corner unit 64 is used above doors and windows forming a header, as well as the lower sill of a window as seen in FIGS. 1, 3 and 4. The corner unit 64 has all of its bricks 66 turned in the same direction so that on one side the bricks form a narrow ledge 68 while the opposite side forms a wide ledge 70. The bricks 66 are molded to a corner metal lath 30 and locked thereto as seen in FIG. 21. When applied to a window as in FIGS. 3 and 4 and the valleys are pointed with mortar, they present a reproduction of regularly laid bricks.

In order to make the panels 20 and the corner members 28, 54 and 64, jigs and molds are used, as seen in FIGS. 7, 8 and 9, for the flat panels, and FIGS. 11 through 16 for the corner members. To make the side panel member, as seen in FIG. 10, a jig or base member 72 is used which has a recess area 74, the opening of which is the same size, shape and depth as the reinforcing sheet of mesh metal lath member 44. The metal lath is flush with the top surface 76 of the base member 72 when it is placed within the recess. The metal lath is made from a sheet of expanded metal of uniform thickness and is precut to the proper shape and size before using as a base for forming the side panel units 20.

After the latch member 44 is located within the recess 74 a grid mold 78 of metal or other suitable material is fitted in place within the aligning corner members 80 and rests upon the top surface 76 of the base 72. The grid mold 70 is formed by walls 82 which follow and cover a part of the perimetric contour of the metal lath 44. The portion of the metal lath covered by the walls 82 is one-half the width of the interior partitions 84 in order that the valleys or depressions to be formed about the edges of the panel unit mate with likely valleys about the edges of adjacent units when the units are assembled and secured to a wall. Partitions 84 are arranged to divide the interior of the gridmold 78 into molding cavities each the size and shape of the blocks or the design which are to be cast, and the width of the partitions 84 is that desired for the width of valleys or mortar spaces between blocks. Grid mold 78 and base member 72 together form the panel mold 86 seen in FIG. 8. The cement or other plastic material 88 is poured into the cavities of the grid mold 78 to give the desired thickness to the blocks being formed. If the blocks are made of clay they may be fired. Because the blocks are made of clay the firing takes only about one-tenth the time needed to bake conventional bricks.

The metal lath 44 is embedded permanently in the block material when the latter sets and hardens. This provides a strong flexible panel member 20 with a plurality of staggered spaced blocks 46 permanently secured to the surface of the metal lath 44.

FIG. 10 discloses a panel unit 20 molded by panel mold 86 comprising a mesh metal lath backing 44 having blocks 46 equally spaced and fixed thereon and providing valleys 48 between the blocks 46 that are the width of the partitions 84. Along the perimetric edges of the unit the width of the exposed mesh metal lath 44 is one-half the width of the valley 48 as seen at 90. When panels with similar one-half width valleys are fitted together, a full width valley such as 48 is formed. As will be noted the mesh at the outer edges and in the valleys are exposed.

When the units 20 in FIG. 10 are secured to the side of a wall, nails, staples or other fasteners 22 are driven through the mesh 44 in the exposed area 48, thus securing the panel units 20 to the wall as seen in FIGS. 5 and 6. Such fasteners are of tempered steel and are relatively wide and can readily be driven through wood, concrete or other materials securing the mesh tightly against whatever applied to. The interlocking edges of mating units are also fastened together and to the wall by the fasteners 22. After the units are secured in place on a wall the valleys 48 are filled or pointed with suitable mortar 52 which bonds into the mesh, about the fasteners, behind blocks and adheres to the adjacent walls of blocks 46 thus protecting the mesh and fasteners from the elements and producing a rigid and tough wall structure.

In FIGS. 18, 20 and 21 units for use at corners of walls and openings for doors and windows are shown. The reinforcing mesh lath 30 of a corner member is angular and fits against two faces of the building wall. When molding a corner the precut mesh lath 30 is laid upon a corner jig 92 so that the bead 31 at the apex of the lath 30 rests along the apex 94 of the jig 92. The grid mold assembly 96 seen in FIG. 11 lies upon the mesh lath 30 overlying the outer edges of the same. The cavities 97 formed by the grid mold are then filled with a cement or other material in plastic form to produce the corner unit 28 as seen in FIG. 18. The blocks 32 are disposed alternately as shown, each block 32 exposing a side and an end surface.

The grid mold assembly 96 is formed by laying two of the frame members 98 at right angles to one another and fastening them together by fitting angular end members 100 over studs 102. These are secured at their ends by screws 104 in threaded openings 105 in frame member 98. Frame member 98 as seen in FIG. 13 has a recess 106 on the back or bottom side of the end members. This recess is the same depth of the mesh lath 30 so that once the frame member is laid upon the mesh lath it will overlie it and rest upon the jig 92.

The complete the grid mold a combination of two of the molds 108, 110 or 112 are fitted into the frame members 98 and held in proper relation by end lugs 114 and center dovetail 116 fitting into end slots 118 and dovetail 120 in frame 98. The mold inserts 108, 110 and 112 are slightly undercut so that when assembled in frame members 98 and placed upon the mesh lath 30 they will rest thereon, the frame member 98 resting on jig base 92. The top surface of the grid mold assembly 96 is flush due to the undercutting of the insert molds so that when the corners are poured they will be of uniform thickness such as the side panels 20.

It can be seen that by using any combination of the insert molds, one can come up with several different types of corner arrangements. The mesh lath embedded in the blocks not only reinforces the siding, but gives it flexibility not found in siding having a stiff or board backing. It is possible for one person to cover the side of a building very economically and at a fraction of the cost of a conventional brick wall, while giving the same appearance.

This type of siding is particularly good for remodeling old buildings or store fronts, but may be used efficiently on newly built dwelling where a brick veneer finish is desired. It is possible to cut the siding to any desired length.

It will be obvious to those skilled in the art that various changes may be made in the invention without departing from the spirit and scope thereof and therefore the invention is not limited by that which is illustrated in the drawings and described in the specification, but only a indicated in the accompanying claims.

What is claimed is:

1. A masonry veneer panel for covering the corner of a door or window comprising a base of mesh materia having first and second portions disposed generally nor mal to each other, a plurality of blocks of hardenabl plastic material mounted on said base with portions o each of said first and second portions thereof simulatin, the sides and ends of a masonry block, said blocks bein, spaced apart a predetermined distance and connected b said base only, the portions of said blocks on said firs portion of said base being generally in alignment witl each other providing a facing for the door or window, an said base extending beyond said blocks a distance sub stantially equal to half the predetermined distance be tween blocks, whereby said panel may be mounted on th corner of a door or window, spaced from the next ad jacent base, and thereafter the spaces between said block can be filled with a hardenable plastic material.

2. The structure of claim 1 in which the portions o blocks on said second portion of said base are in staggere relation to each other.

3. The structure of claim 1 in which the portions o blocks on said second portion of said base are generall in alignment with each other.

4. A mold for producing brick veneer corner panel comprising a backing member having a pair of surface disposed at an angle to each other and meeting along common edge to form a corner, a frame member carrie by each surface of said backing member, means releasabl connecting said frame members in assembled relation one of said backing member and frame members bein, recessed to received a mesh material, grid mold mean removably mounted on each of said frame members, sai grid mold means having partitions for defining a pluralit of spaced cavities, said frame members and said grid mol means on each surface of said backing member adapte to meet each other at the corner of said backing member whereby when said backing member, frame members an grid mold means are assembled a plurality of space cavities will be formed for the reception of a hardenabl plastic material which simulates the sides and ends of masonry block.

5. The structure of claim 4 including a plurality o interchangeable grid mold means having different pattern for producing corner panels of various configurations.

References Cited

UNITED STATES PATENTS

| 1,454,293 | 5/1923 | Liptak | 52—38 |
| 1,853,824 | 4/1932 | Krauss | 52—38 |
| 1,994,644 | 3/1935 | Harshberger | 52—38 |
| 2,240,774 | 5/1941 | Harman | 52—38 |
| 2,329,610 | 9/1943 | Harman | 52—38 |
| 3,019,560 | 2/1962 | Hansen | 52—38 |
| 3,077,059 | 2/1963 | Stout | 52—38 |
| 3,332,187 | 7/1967 | Arcari | 52—38 |
| 3,340,660 | 9/1967 | Arcari. | |
| 1,592,591 | 7/1926 | Amele | 52—31 |
| 1,960,979 | 5/1934 | Robinson | 52—60 |

HENRY C. SUTHERLAND, *Primary Examiner.*

J. L. RIDGILL, *Assistant Examiner.*

U.S. Cl. X.R.

249—15, 83, 85; 52—388, 314, 284